Patented Mar. 11, 1941

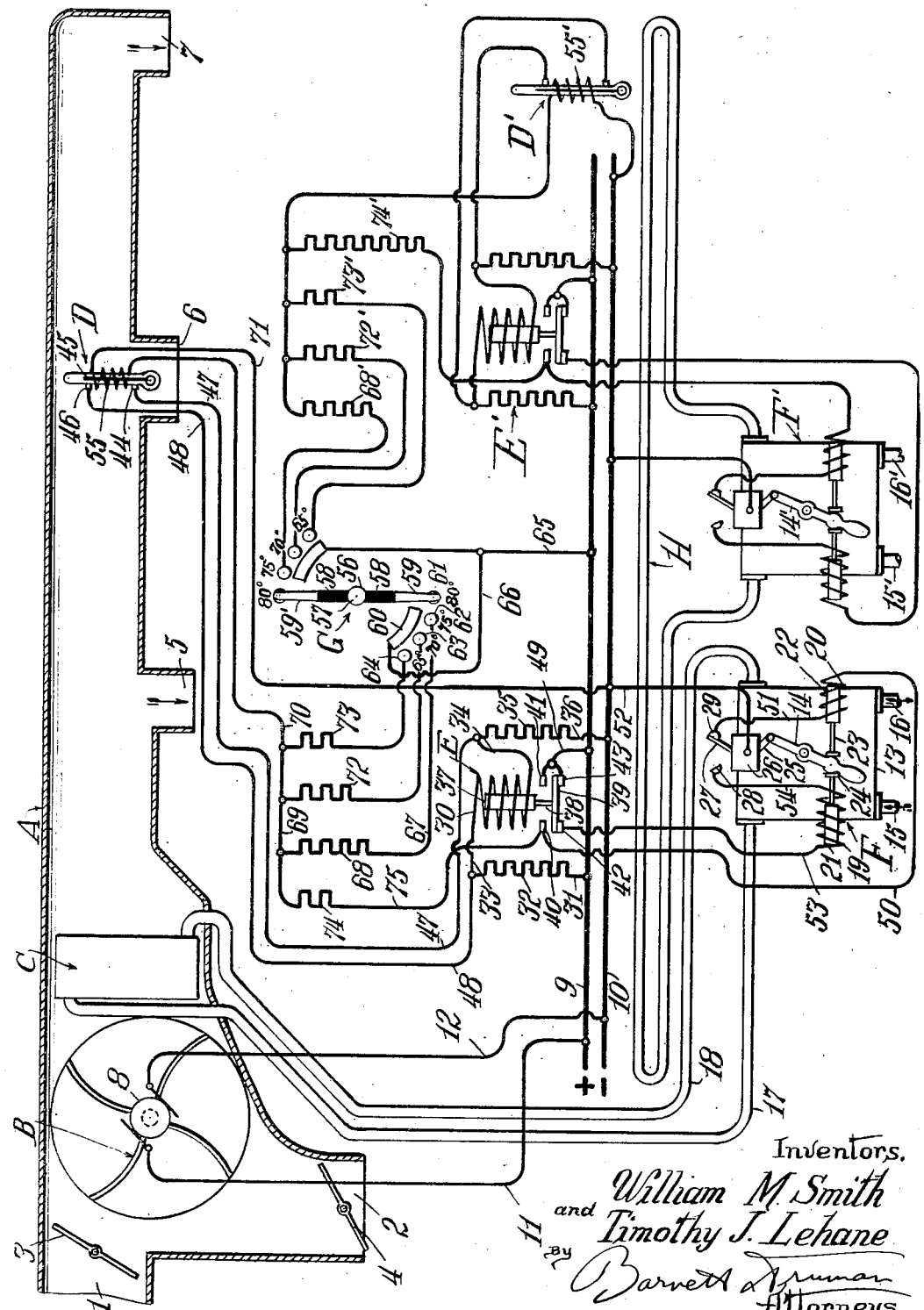

2,234,288

UNITED STATES PATENT OFFICE 2,234,288

TEMPERATURE CONTROL SYSTEM

William M. Smith and Timothy J. Lehane, Chicago, Ill., assignors to Vapor Car Heating Company, Inc., Chicago, Ill., a corporation of New York Application September 20, 1937, Serial No. 164,780

5 Claims. (Cl. 236—68)

This invention relates to certain new and useful improvements in a temperature controlling system, more particularly to a system in which the temperature within a confined space is maintained both by delivering selectively heated air into the space and by transmitting heat directly to the air already within the space.

According to this invention air drawn partly from within the space and partly from outside the enclosed space is forced through a conduit in contact with a radiator or other heat-transmitting device and then delivered through suitable outlets into the space to be heated. In the case of a railway car to which this system is particularly applicable, these outlets are preferably situated at intervals throughout the length of the car and adjacent the roof. In addition, a radiator is positioned directly within this space, in the case of a railway car this radiator extending from end to end of the car adjacent the floor so as to heat that portion of the air within the space that would not be properly affected or displaced by the air delivered into the space from the conduit. As a result a substantially uniform temperature will be maintained throughout the space. The temperature of the first mentioned air stream is regulated by a thermostat positioned within the conduit and controlling a valve which admits heating medium to the conduit-radiator. In a similar manner a thermostat positioned within the portion of the space directly heated by the floor radiator controls a valve which admits heating medium to the floor radiator. In order to selectively adjust the temperatures maintained within the space, each thermostat is provided with an auxiliary electric heating element whereby a certain amount of additional heat may be applied to the thermostat to change or regulate the temperature at which the thermostat will function. It is desirable that the temperatures maintained at the two radiators be the same or at least similarly coordinated, and means are provided to simultaneously adjust the auxiliary heat applied at each thermostat so that the temperatures will be similarly regulated.

In order that the temperature variation of the air stream within the conduit may be maintained within as narrow limits as possible, it is desirable to maintain a substantially constant output of heat from the conduit radiator and in order to accomplish this result this radiator should be maintained partially filled with steam or other heating medium to the extent necessary for the desired heat output. Automatically acting means are provided to apply additional auxiliary heat to the conduit-thermostat immediately the valve is opened so that the thermostat will act to quickly close the valve. In this way only a short spurt of steam will be admitted to the radiator. When the system is cold the thermostat and valve will cycle rapidly, that is a rapid succession of spurts of steam will be admitted to the radiator, but as the desired temperature is approached within the conduit the intervals between the spurts of steam, when the valve is closed, will increase in length, until short bursts of steam are admitted to the radiator only at sufficiently separated intervals to maintain the desired radiator temperature.

On the other hand, it is essential that the floor radiator be substantially filled with steam since this radiator extends throughout the length of the car or other space to be heated and if only partially filled the heating would be undesirably localized. Accordingly, the valve admitting steam to this radiator is so controlled that it will be opened and closed at more widely separated intervals. Automatic means is, however, provided for somewhat expediting the closing of the valve, that is for cutting off the admission of steam before the desired floor temperature is actually reached, since there is a certain lag in the response of the controlling thermostat and heat stored in the radiator will be transmitted after the flow of heating medium has been cut off.

The principal object of this invention is to provide an improved temperature controlling system of the type briefly described hereinabove and disclosed more in detail in the specifications which follow.

Another object is to provide an improved means for rapidly cycling the operation of a thermostat and valve for controlling the admission of steam to a radiator so as to maintain the radiator partially filled at a desired level.

Another object is to provide means for simultaneously admitting heated air to a space and heating the air within the space and coordinating the temperatures maintained throughout the space.

Another object is to provide improved means for selecting the temperatures to be maintained within the space.

Other objects and advantages of this invention will be more apparent from the following detailed description of one approved form of apparatus constructed and operating according to the principles of this invention.

The accompanying drawing is a wiring diagram, showing the principal objects of the heating system diagrammatically.

The conduit A has an inlet 1 leading from the outer air through which fresh air is admitted, and a second inlet 2 through which air may be withdrawn or returned from the space being heated. The proportions of air drawn from the two sources (and thereby the percentage of fresh air used) may be determined by the adjustment of the valves indicated at 3 and 4 respectively. This air is forced by the fan or blower B past and in contact with the radiator or similar heat transmitting device C and is delivered into the space through the several outlets 5, 6 and 7. It will be understood that these outlets may be distributed as desired and in the case of a railway car will be located at suitable intervals throughout the length of the car and usually near the roof. The temperature of the air stream delivered from conduit A will be regulated by the thermostat indicated generally at D which, through relay E controls the valve F which regulates the flow of steam or other heating medium to the radiator C.

The blower B may be driven by the motor 8 energized through the following circuit: From positive main 9 through wire 11, motor 8, and wire 12 back to negative main 10. It will be understood that any suitable cut-out switch may be provided in this circuit, or the blower may be automatically cut into and out of circuit along with the control mechanism hereinafter described.

The valve F is of well known type comprising a casing 13 containing a plurality of valve chambers which are selectively connected by a partially rotatable member controlled by the intermediately pivoted lever 14. When this valve is in the closed position shown in the drawing, steam from the source of supply will enter casing 13 through pipe 15 and will immediately flow out again through pipe 16 back to the vapor-regulator or source of supply. When lever 14 is swung in a counter-clockwise direction to a similar position with its lower end inclined toward the right, the steam from the source of supply will flow into the casing through pipe 15, thence through pipe 17 into radiator C, and the steam and condensate will flow back from the radiator through pipe 18 to valve casing 13 and thence out through pipe 16. The valve is moved from open to closed position or vice versa by the solenoid motors 19 and 20 provided respectively with the cores 21 and 22 connected by stem 23 having an intermediate yoke 24 engaging one arm of the operating lever 14. When solenoid 19 is energized it will draw in core 21 and swing the lever 14 to the position shown in the drawing which closes the valve. When solenoid motor 20 is energized, the lever 14 will be swung in the opposite direction to open the valve. The upper end of lever 14 has a connection at 25 with a snap switch 26 comprising a movable contact 27 adapted to engage alternatively with the two fixed contacts 28 and 29.

The relay E comprises a solenoid coil 30 which is normally energized over the following circuit: From positive main 9 through wire 31, resistance 32, wire 33, coil 30, wire 34, resistance 35, and wire 36 to the negative main 10. When solenoid coil 30 is thus energized it will draw up the core 37, which through stem 38 lifts the contact plate 39 into engagement with the pair of fixed contacts 40 and 41. When the coil 30 is deenergized, the contact plate 39 will drop into engagement with a second pair of fixed contacts 42 and 43.

The thermostat D is of the well known mercury-column type comprising a lower fixed contact 44 which is always in engagement with the mercury column 45 and an upper contact 46 which will be engaged by the mercury column at a certain predetermined maximum temperature. When this temperature is reached, a circuit will be completed to short-circuit and thus deenergize the relay coil 30, this circuit being as follows: From one terminal of coil 30 through wire 47, fixed contact 44, mercury column 45, contact 46, and wire 48 to the other terminal of the relay coil. As shown in the drawing, the required temperature has been reached and the relay is deenergized.

When the temperature of the air stream passed through conduit A falls below the desired temperature, the mercury column 45 will break contact with fixed contact 46 and the shunt circuit last described will be broken so that relay E will again be energized so as to lift contact 39 into engagement with the upper pair of fixed contacts 40 and 41. An energizing circuit for valve F will now be completed as follows: From positive main 9 through wire 49, relay contacts 41, 39 and 40, wire 50, solenoid coil 20, wire 51, snap switch contacts 29 and 27, and wire 52 to the negative main 10. Motor 20 will now shift lever 14 to its other position so as to open the valve F and permit a flow of steam to the radiator C. When the temperature of the air stream in the conduit has again been raised to the desired level, the shunt circuit through the thermostat D will be reestablished thus deenergizing the relay coil 30 and permitting contact 39 to drop to the position shown in the drawing. This will establish the following valve-operating circuit: From main 9 through wire 49, relay contacts 43, 39 and 42, wire 53, solenoid coil 19, wire 54, snap switch contacts 28 and 27 (the snap switch was moved to its opposite position at the completion of the valve-opening operation), and wire 52 to the negative main 10. This will shift the valve back to the position shown in the drawing and close the valve to cut off the further flow of steam to the radiator.

The thermostat D is provided with an auxiliary heating element indicated at 55, usually in the form of an electric resistance coil wrapped around or closely associated with a portion of the thermostat. If the thermostat is so constructed that it will normally function at a temperature of, for example, 80° Fahrenheit (that is mercury column 45 will engage fixed contact 46 at 80°), and current of sufficient strength is passed through coil 55 to add 5° of heat to the thermostat, it will be apparent that the thermostat will now function at an atmospheric temperature of 75° since the response of the thermostat to the temperature of the air plus the five additional degrees of heat added by coil 55 will cause the mercury column to engage the fixed contact 46. It will thus be apparent that by adjusting the strength of the current passed through coil 55 the temperature at which the thermostat will function may be readily adjusted within certain limits.

At G is indicated a manual selecting switch for determining the temperature at which thermostat D (as well as thermostat D' hereinafter described) will function. As here diagrammatically shown this control switch comprises an operating knob 56 by means of which an intermediately pivoted lever may be swung in a clockwise direction about the center 57 from the position shown in the drawings. This lever comprises a central portion 58 of insulating material and a metallic conducting end portion 59 adapted to engage the arcuate contact 60 as well as any one of the fixed contacts 61, 62, 63 and 64. In the initial position shown in the drawing, with member 59 resting on contact 61 which has no electrical connection, there will be no energizing circuit for heating element 55 of the thermostat and the thermostat will function normally at 80°. If the lever 59 is swung in a clockwise direction until it simultaneously engages the arcuate contact 60 and fixed contact 62 the following energizing circuit for heating element 55 will be completed: From positive main 9 through wires 65 and 66, contact 60, lever 59, contact 62, wire 67, resistance 68, wires 69 and 70, heating coil 55, and wire 71 back to the negative main 10. Resistance 68 will be so selected that the current flowing through heating coil 55 will produce 5° of heat at the thermostat and the thermostat will now function at 75°. Similarly, if the lever is swung over so as to engage simultaneously the arcuate contact 60 and fixed contact 63, a similar energizing circuit containing the resistance 72 will be completed. This resistance is somewhat smaller than resistance 68 so that a larger current will flow through the heating coil 55 and the thermostat will now function at 70°. A third alternative circuit containing the still smaller resistance 73 is completed when the lever is moved to engage contact 64, and it may now be assumed that the thermostat will function at 65°. It will be understood that the temperatures here stated are merely assumed by way of example and that any desired temperatures may be selected.

It will be noted that a fourth resistance is indicated at 74. When valve F is moved to its open position, relay contact plate 39 will be in engagement with the upper pair of contacts 41 and 40, and at this time another circuit will be completed as follows: From positive main 9 through wire 49, relay contacts 41, 39 and 40, wire 75, resistance 74, wire 69, and as before through coil 55 and back to the negative main. Assuming that resistance 68 has previously been selected for the heater circuit and the thermostat is set to function at 75°, as soon as the valve is opened the resistance 74 is thrown in parallel with resistance 68, and resistance 74 is so selected that the total resistance in the heater circuit will be greatly diminished thus greatly increasing the current through heating coil 55 so that the thermostat column 45 will again be quickly lifted into engagement with the fixed contact 46. This will again close the valve F very soon after it has been opened so that only a short spurt or burst of steam is admitted to the radiator C. If the system is just being started in cold weather and the temperature of the air delivered through conduit A is still far below 75°, the mercury column 45 will soon fall out of engagement with fixed contact 46 since resistance 74 is again cut out of the circuit as soon as the valve F is closed, the circuit through resistance 74 being broken between relay contacts 39 and 40. As a result the thermostat D and valve F will cycle or go on and off rapidly, a series of bursts of steam being admitted to the radiator C. As the temperature of the air stream approaches the desired level, the mercury column 45 will not fall as rapidly as before and the intervals between the bursts of steam will be increased in length. Finally a condition will be reached where only periodic bursts of steam are admitted to the radiator C, enough to maintain the radiator partially full of steam and at a temperature sufficient to deliver air at 75° through the outlets 5, 6 and 7. Of course the actual temperature in radiator C will be considerably higher than the temperature of the air stream, but the radiator temperature will be so adjusted in this manner that the desired air stream temperature will be maintained substantially constant. In order to properly meet all conditions, the radiator C must have a capacity such that if it were completely filled with steam it would heat the air stream to an excessive temperature under ordinary conditions. The cycling system just described permits the radiator to be maintained in such a partially filled condition that it will satisfy the heat requirements at all times.

The floor radiator H consists of a series of pipe lengths suitably connected so as to reach into all of the portions of the space which this radiator is to heat. As usual in railway cars this radiator runs the length of the car adjacent the floor. The ends of the pipe loops are connected with valve F' which functions in all respects the same as the valve F previously described. The thermostat D' which controls the heat output from floor radiator H may be in all respects the same as the overhead heat thermostat D, but thermostat D' is preferably located in the lower portion of the car or in that portion of the space that is directly heated by radiator H. Thermostat D' controls valve F' through relay E' in the same manner as has already been described in connection with the unprimed elements.

The thermostat D' is provided with an auxiliary heating coil 55', and the upper end portion of selector switch G is adapted to simultaneously make a selection between the resistances 68' and 72' and 73' in the energizing circuit for heater 55' so that the same or a similar temperature correction will be made for thermostat D' as is made for thermostat D. Ordinarily it will be desirable to maintain the same temperature at both thermostats, that is the air delivered into the upper portion of the space should be substantially the same temperature as the air in the lower portion of the space as heated by radiator H. If a certain differential between these temperatures is found to be desirable this may be easily adjusted by suitably selecting the thermostat setting or changing the values of the resistances used in the energizing circuits. In general, however, it is desirable to coordinate the temperatures maintained in the overhead air stream and the lower portion of the space as heated by radiator H, and consequently the auxiliary heaters are simultaneously adjusted by means of the selector G.

There is, however, a substantial difference in the functioning of the resistance 74' (which is placed in parallel with one of the resistances 68', 72' or 73' when valve F" is open) and the operation of resistance 74 as already described. The floor radiator H cannot be successfully operated on the partial filling principle since this radiator is of considerable length and if only partially filled the heat will be localized in one portion of the radiator and other portions of the space would not be benefitted thereby. It is therefore desirable to operate valve F" at greater intervals than valve F, the radiator H being first completely filled with steam, and then the steam supply is cut off when the desired temperature is reached and the steam permitted to condense throughout the length of the radiator until more steam is required. However, if we permitted the steam to flow into radiator H until the desired temperature (for example 75°) was reached at thermostat D' the required floor heat would be exceeded since there is a certain lag in the functioning of the thermostat. That is, sufficient heat will be stored up in radiator H at the time the valve F' is closed to continue heating the air so that an excessive temperature (for example 76° or 77° might be reached at the thermostat D' before the temperature becomes stabilized or starts to fall. For this reason it is desirable to close the valve F' somewhat before the desired temperature is reached at thermostat D'. The resistance 74' is thrown in parallel with the selected resistances 68', 72', or 73' as soon as valve F' opens with the result that the heat imparted from auxiliary heater 55' will be slightly increased while the valve is open and the temperature at which thermostat D' functions is slightly lowered, enough to offset the "over-shooting" that would result from the heat stored up in radiator H.

It will thus be seen that while the control elements used in connection with both the overhead and floor heat are much the same, the functioning is quite different and considerably different results are reached due simply to the difference in the values of resistances 74 and 74'. Resistance 74 is so selected that the auxiliary heat will be greatly increased immediately valve F is opened so as to almost immediately cause the valve to again be closed, whereas resistance 74' is so selected that the auxiliary heat applied to thermostat D' will only be slightly increased and the valve will remain open for a considerable length of time, but will however be closed soon enough to prevent the eventual exceeding of the desired temperature at thermostat D'.

We claim:

1. In combination, means to transmit heat to a body of air, a valve controlling the flow of heating medium to the transmitting means, means for momentarily opening and immediately thereafter closing this valve comprising a thermostat responding to temperature changes in the body of air and functioning to open the valve whenever this temperature falls below a predetermined minimum, an electric heating element associated with the thermostat, an energizing circuit for the heating element, manually operable variable resistance means in said circuit for determining the amount of auxiliary heat normally applied to the thermostat and thereby determining the value of the minimum temperature at which the thermostat functions, and means automatically operated simultaneously with the opening of the valve for immediately decreasing the resistance in the circuit while the valve is open and restoring the resistance to its manually set value while the valve is closed whereby the auxiliary heat will be greatly increased only while the valve is open.

2. In combination, means to transmit heat to a body of air, a valve controlling the flow of heating medium to the transmitting means, means for momentarily opening and immediately thereafter closing this valve comprising a thermostat responding to temperature changes in the body of air and a circuit closed by the thermostat at a predetermined maximum temperature to effect the closing of the valve, the valve being opened whenever the temperature at the thermostat falls below this maximum, an electric heating element associated with the thermostat, an energizing circuit for the heating element, manually operable variable resistance means in this circuit for determining the amount of auxiliary heat normally applied to the thermostat and thereby determining the value of the maximum temperature at which the thermostat functions to close the valve, and means automatically operated simultaneously with the breaking of the thermostat circuit and the opening of the valve for decreasing the resistance in the energizing circuit whereby the auxiliary heat will be sufficiently increased to promptly restore the maximum temperature and close the valve said latter means restoring the manually set resistance value as soon as the valve is closed.

3. In combination, a conduit, a radiator in said conduit, means to force an air stream through the conduit in contact with the radiator, a valve to control the flow of steam to said radiator, electrically operated means for opening and closing the valve, a thermostat in the conduit and responsive to changes in the temperature of the heated air stream, a control circuit closed by the thermostat at a predetermined maximum temperature to cause the valve-operating means to close the valve, the valve being opened whenever the temperature at the thermostat falls below this maximum, and means controlled by the thermostat for immediately applying auxiliary heat directly to the thermostat simultaneously with the the opening of the valve to promptly restore the maximum temperature at the thermostat and thereby close the valve, so that the valve is only opened momentarily to permit a restricted flow of steam to the radiator insufficient to fill the radiator, the lengths of the intermediate closed intervals increasing as the temperature of the heated air stream approaches the desired temperature at which the thermostat is designed to function.

4. In combination, a conduit, a radiator in said conduit, means to force an air stream through the conduit in contact with the radiator, a valve to control the flow of steam to said radiator, electrically operated means for opening and closing the valve, a thermostat in the conduit and responsive to changes in the temperature of the heated air stream, a control circuit closed by the thermostat at a predetermined maximum temperature to cause the valve-operating means to close the valve, the valve being opened whenever the temperature at the thermostat falls below this maximum, an electric heating element associated with the thermostat, an energizing circuit for the heating element, manually operable variable resistance means in this circuit for determining the amount of auxiliary heat normally applied to the thermostat and thereby determining the value of the maximum temperature at which the thermostat functions to close the valve, and means automatically operated simultaneously with the opening of the valve for decreasing the resistance in the energizing circuit whereby the auxiliary heat will be sufficiently increased to promptly restore the maximum temperature and close the valve so that the valve is only open momentarily to permit a restricted flow of steam sufficient to fill the radiator.

5. In combination, a radiator to transmit heat to a body of air, a valve controlling the flow of heating medium to the radiator, electrically operated means for opening and closing the valve, a thermostat responding to temperature changes in the body of air, a control circuit closed by the thermostat at a predetermined maximum temperature to cause the valve-operating means to close the valve, the valve being opened whenever the temperature at the thermostat falls below this maximum, an electric heating element associated with the thermostat, an energizing circuit for the heating element, manually operable variable resistance means in this circuit for determining the amount of auxiliary heat normally applied to the thermostat and thereby determining the value of the maximum temperature at which the thermostat functions to close the valve, and means automatically operated simultaneously with the opening of the valve for decreasing the resistance in the energizing circuit whereby the auxiliary heat will be sufficiently increased to promptly restore the maximum temperature and close the valve so that the valve is only open momentarily to permit a restricted flow of steam insufficient to fill the radiator.

WILLIAM M. SMITH
TIMOTHY J. LEHANE.